US 12,067,122 B2

(12) United States Patent
Shaver et al.

(10) Patent No.: US 12,067,122 B2
(45) Date of Patent: Aug. 20, 2024

(54) DETECTING ADDED FUNCTIONALITY IN OPEN SOURCE PACKAGE

(71) Applicant: Microsoft Technology Licensing, LLC, Redmond, WA (US)

(72) Inventors: Jason R. Shaver, Redmond, WA (US); Gabriel Pedro De Castro, Kenmore, WA (US); Kesavan Shanmugam, Redmond, WA (US); Yuval Mazor, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 624 days.

(21) Appl. No.: 17/131,446

(22) Filed: Dec. 22, 2020

(65) Prior Publication Data

US 2022/0198003 A1 Jun. 23, 2022

(51) Int. Cl.
*G06F 21/57* (2013.01)
*G06F 8/41* (2018.01)
*G06F 8/51* (2018.01)
*G06F 8/70* (2018.01)
*G06F 8/75* (2018.01)
*G06F 9/455* (2018.01)

(52) U.S. Cl.
CPC ............ *G06F 21/577* (2013.01); *G06F 8/44* (2013.01); *G06F 8/51* (2013.01); *G06F 8/70* (2013.01); *G06F 8/751* (2013.01); *G06F 9/45508* (2013.01); *G06F 2221/033* (2013.01)

(58) Field of Classification Search
CPC ........ G06F 8/33; G06F 8/40–53; G06F 8/751; G06F 40/40
USPC .................................. 717/110–113, 136–161
See application file for complete search history.

(56) References Cited

U.S. PATENT DOCUMENTS

| | | | |
|---|---|---|---|
| 8,307,351 | B2 | 11/2012 | Weigert et al. |
| 8,429,632 | B1 * | 4/2013 | Coutant ............... G06F 11/362 |
| | | | 717/124 |
| 9,304,980 | B1 | 4/2016 | Hartsook et al. |
| 10,339,575 | B2 | 7/2019 | Agrawal et al. |

(Continued)

FOREIGN PATENT DOCUMENTS

WO WO-2010014323 A1 * 2/2010 ............. G06F 17/30

OTHER PUBLICATIONS

Duan, Ruian, et al., Identifying Open-Source License Violation and 1-day Security Risk at Large Scale, CCS '17: Proceedings of the 2017 ACM SIGSAC Conference on Computer and Communications Security, Oct. 2017, 17 pages, [retrieved on Apr. 1, 2024], Retrieved from the Internet: <URL:http://dl.acm.org/>.*

(Continued)

*Primary Examiner* — Geoffrey R St Leger
(74) *Attorney, Agent, or Firm* — Workman Nydegger (57) ABSTRACT

Detecting whether or not an open source software package has functionality which is not described by the source code used to build the open source software package. To do so, in one embodiment, this is done by accessing source code used to build the open source software package. The open source software package is built from the source code. After the open source software package has been rebuilt, then it is computed whether or not the rebuilt package accomplishes the same functions as the open source software package. Finally, if the rebuilt package does not accomplish the same functions as the open source software package, an alert is raised.

15 Claims, 7 Drawing Sheets

(56) References Cited

U.S. PATENT DOCUMENTS

| | | | |
|---|---|---|---|
| 10,657,253 B2 | 5/2020 | Lie et al. | |
| 2004/0148595 A1* | 7/2004 | Dutta | G06F 8/4441 |
| | | | 717/159 |
| 2013/0031371 A1 | 1/2013 | Mclellan et al. | |
| 2013/0074038 A1 | 3/2013 | Fox et al. | |
| 2013/0254880 A1 | 9/2013 | Alperovitch et al. | |
| 2019/0087550 A1* | 3/2019 | Kim | G06F 21/105 |
| 2019/0205125 A1 | 7/2019 | Van Schaik | |
| 2019/0377662 A1* | 12/2019 | Mitchell | G06F 8/75 |
| 2020/0050768 A1 | 2/2020 | Ragnoli et al. | |
| 2020/0364344 A1 | 11/2020 | Liu et al. | |
| 2021/0141891 A1* | 5/2021 | Weinzettl | H04L 9/50 |
| 2022/0197999 A1* | 6/2022 | Mo | G06F 21/31 |

OTHER PUBLICATIONS

Davies, et al., "Software Bertillonage: Finding the Provenance of an Entity", In Proceedings of the 8th Working Conference on Mining Software Repositories, May 21, 2011, pp. 183-192.

Van Der Burg, et al., "Discovering Software License Constraints: Identifying a Binary's Sources by Tracing Build Processes", In Technical Report Series TUD-SERG-2012-010, Apr. 2012, 16 Pages.

"International Search Report and Written Opinion Issued in PCT Application No. PCT/US21/057487", Mailed Date: Feb. 23, 2022, 14 Pages. (MS# 409062-WO-PCT).

Communication pursuant to Article 94(3) EPC, Received for European Application No. 21815759.2, mailed on May 2, 2024, 06 pages.

* cited by examiner

DETECTING ADDED FUNCTIONALITY IN OPEN SOURCE PACKAGE

BACKGROUND

Open source software is a type of software in which a publisher releases the source code of the software along with a license dictating the terms for using, distributing, and/or modifying the software. The process of publication of an open source software package typically involves a publisher generating source code and building a corresponding package using an original build environment. An open source software package usually includes the license and a deliverable. The deliverable may include a source code file and/or an executable artifact (e.g. binaries, machine code, .exe files, or libraries). The publisher then signs the open source software package, and publishes the signed package to a package manager.

Some open source software packages can be consumed and executed independently. Other open source software packages are building blocks which are combined with other software to create a product. A developer can use one, dozens, or hundreds of open source software packages in their own codebase and ship the codebase to others. Thus, open source software is advantageous because it enables a developer to properly use the work of others to advance their own work.

A package manager is an entity to which various publishers of open source can place the open source software packages they are willing to share. Others can then access those open source software packages from the package manager. The package managers are typically specific to a particular language (e.g. c# package manager, java script package manager, etc.). Thus, entities working on a codebase in a particular language can go to a specific package manager to search for open source packages of interest.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The principles described herein relate to detecting whether or not an open source software package has functionality which is not described by the source code used to build the open source software package. After an open source software package has been built from source code, additional functionality may be introduced into the package. The additional functionality can be harmful and thus presents a risk for using an open source software package which may or may not have additional functionality. The embodiments described herein allow a developer to reduce the risk of using open source software packages by enabling the developer to detect additional functionality in an open source software package.

In one embodiment, this is done by accessing source code used to build the open source software package. The open source software package is rebuilt from the source code. After the open source software package has been rebuilt, it is then computed whether or not the rebuilt package accomplishes the same functions as the open source software package. Finally, if the rebuilt package does not accomplish the same functions as the open source software package, an alert is raised.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to detecting whether or not an open source software package has functionality which is not described by the source code used to build the open source software package. After an open source software package has been built from source code, additional functionality may be introduced into the package. The additional functionality can be harmful and thus presents a risk for using an open source software package which may or may not have additional functionality. The embodiments described herein allow a developer to reduce the risk of using open source software packages by enabling the developer to detect additional functionality in an open source software package.

In one embodiment, this is done by accessing source code used to build the open source software package. The open source software package is rebuilt from the source code. After the open source software package has been rebuilt, it is then computed whether or not the rebuilt package accomplishes the same functions as the open source software package. Finally, if the rebuilt package does not accomplish the same functions as the open source software package, an alert is raised.

Figure 1:
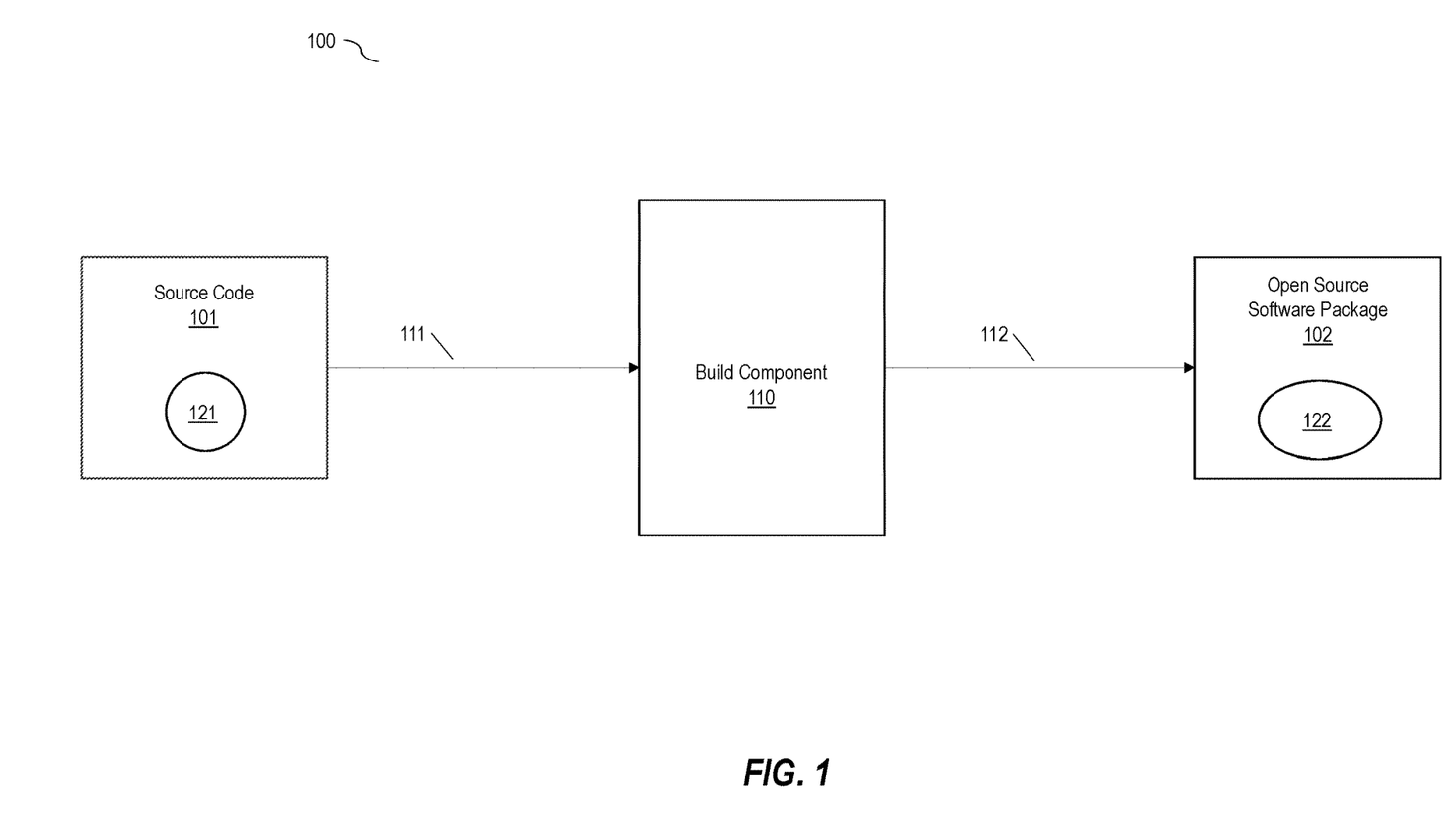
FIG. 1 illustrates an example build environment used to build an open source software package.

FIG. 1 illustrates an environment 100 in which an open source software package is originally built Source code 101 includes a compilation of commands written in an interpretable language or a compilable language. The source code 101 describes functionality 121. In the paradigm of FIG. 1, this functionality 121 is represented as a circle for reasons that will be later described. The functionality includes capabilities of the source code when converted to machine code and executed by a computing system.

The written source code 101 is then used to generate an open source software package 102. As shown by arrow 111, the source code is sent to a build component 110. The build component 110 that receives the source code 101 then uses the source code 101 to produce (as represented arrow 112) the open source software package 102. In order to generate the open source software package 102, the build component 110 may perform a variety of processes on the source code 101. For example, the build component 110 may compile the source code into an executable. In another example, the build component 110 may transform the source code 101 itself, such as performing a minimization to eliminate white space and reduce the size of the resulting package 102. If the environment 100 is implemented within a computing system, such as the computing system 700 described below with respect to FIG. 7, the build component 110 is structured as described below for the executable component 706.

The open source software package 102 also has functionality 122. In the illustrated case, the functionality 122 is represented by an oval 122. The functionality 122 of the open source software package 102 could be identical to the functionality 121 of the source code 101. However, there could also be differences. The circle 121 and oval 122 symbolically represent how the functionality 121 of the source code 101 and functionality 122 of the open source software package 102 may be similar, but might not be identical. The open source software package 102 may have different functionality because additional functionality was introduced to the open source software package 102. The additional functionality of the open source software package 102 is functionality which is not described by the source code 101.

In some instances, the additional functionality is introduced to the package by a compromised build environment of the build component 110. Alternatively, or in addition, the additional functionality may be introduced after the open source software package 102 has been generated and published to a package manager. For example, this may occur while the open source software package 102 is in storage on either a source repository or a developer's computing system. Finally, the additional functionality might also be introduced to the open source software package 102, while the package is in transit from a first network location to a second network location. For example, additional functionality might be introduced while the open source software package 102 is being transmitted from a source repository to a developer's computing system.

The additional functionality is possibly malicious or harmful and therefore, a developer incurs risk for using an open source software package 102. The principles described herein aim to reduce this risk by detecting whether or not an open source software package includes functionality which is not described by the source code. If so, the developer is alerted, allowing for the issue and potential risk to be identified, and therefore potentially managed.

Figure 2:
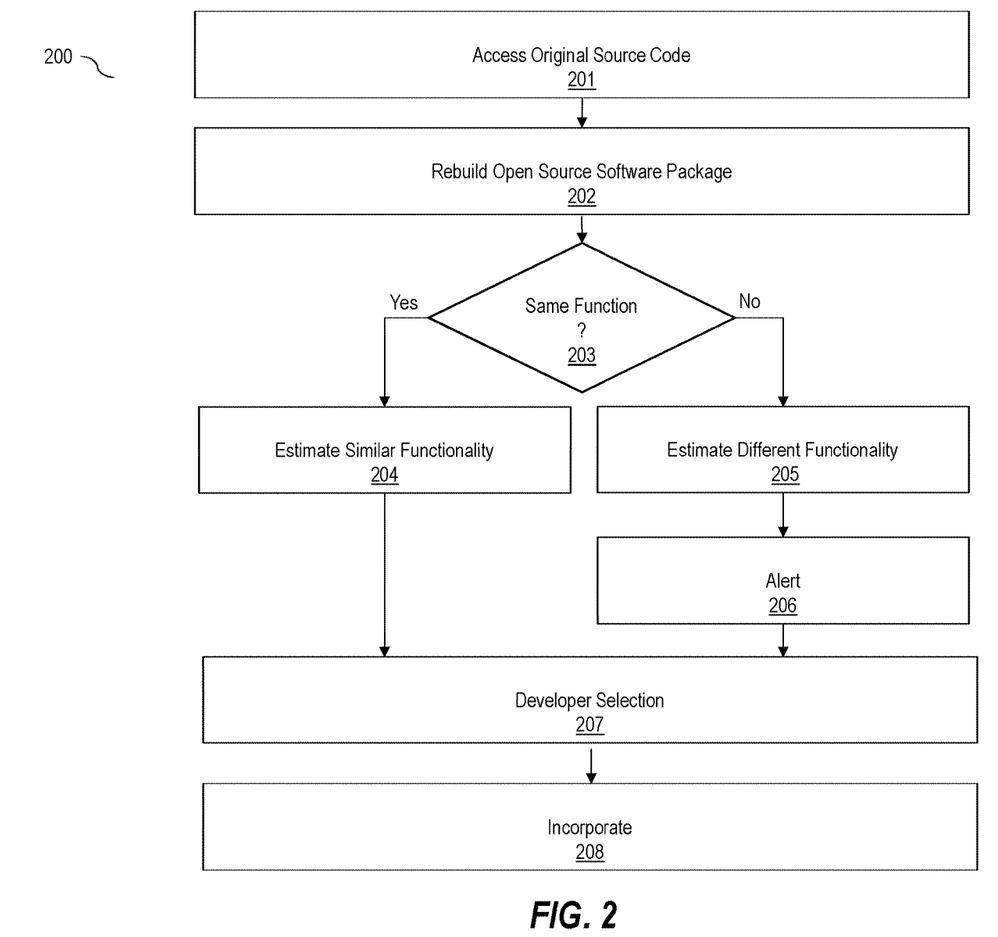
FIG. 2 illustrates a flowchart of a method for detecting whether an open source software package has additional functionality.

FIG. 2 illustrates a flowchart of a method 200 for detecting whether or not an open source software package has functionality which is not described by source code used to originally build the open source software package. This is accomplished by retracing at least some the acts performed on the source code during the original build and substantively repeating those acts to generate a new rebuilt package. In this sense, this method establishes a supply chain pedigree for the open source software package. The following discussion now refers to a number of methods and method acts that may be performed. Although the method acts may be discussed in a certain order or illustrated in a flow chart as occurring in a particular order, no particular ordering is required unless specifically stated or required (e.g., because an act is dependent on another act being completed prior to the act being performed).

Referring again to FIG. 2, the method 200 includes accessing the original source code used to build the open source software package (act 201). After the source code has been accessed, the method includes rebuilding the open source software package from the source code (act 202). Following the rebuild, the method includes computing whether or not the rebuilt package accomplishes the same functions as the open source software package (decision block 203). If the open source software package and the rebuilt package are the same ("Yes" in decision block 203), the method 200 includes estimating that the open source software package has the same functionality as the rebuilt package (act 204). The open source software package may be tagged or one of its attributes set, to mark the open source software package as having the same functional as when it was original built. The similar functionality between the open source software package and the rebuilt package indicates that the open source software package is likely safe and does not include any additional functionality that was not represented in the original source code.

If the original and rebuilt open source software packages are not the same ("No" in decision block 203), the method 200 includes estimating that the open source software package does not have the same functionality (act 205). The open source software package may be tagged or one of its attributes set, to mark the open source software package as having different functional than when it was original built. The different functionality between the open source software package and the rebuilt package indicates that the open source software package may include additional potentially unsafe functionality that was not within the original source code. Thus, the method includes alerting an appropriate entity that the rebuilt package does not accomplish the same functions as the open source software package (act 206) if indeed that is the case. That appropriate entity could be, by way of example only, a user, a developer, and IT administrator, an artificial intelligence, a risk assessment component, or the like. The remainder of FIG. 2 will be described after a brief description of FIG. 3.

Figure 3:
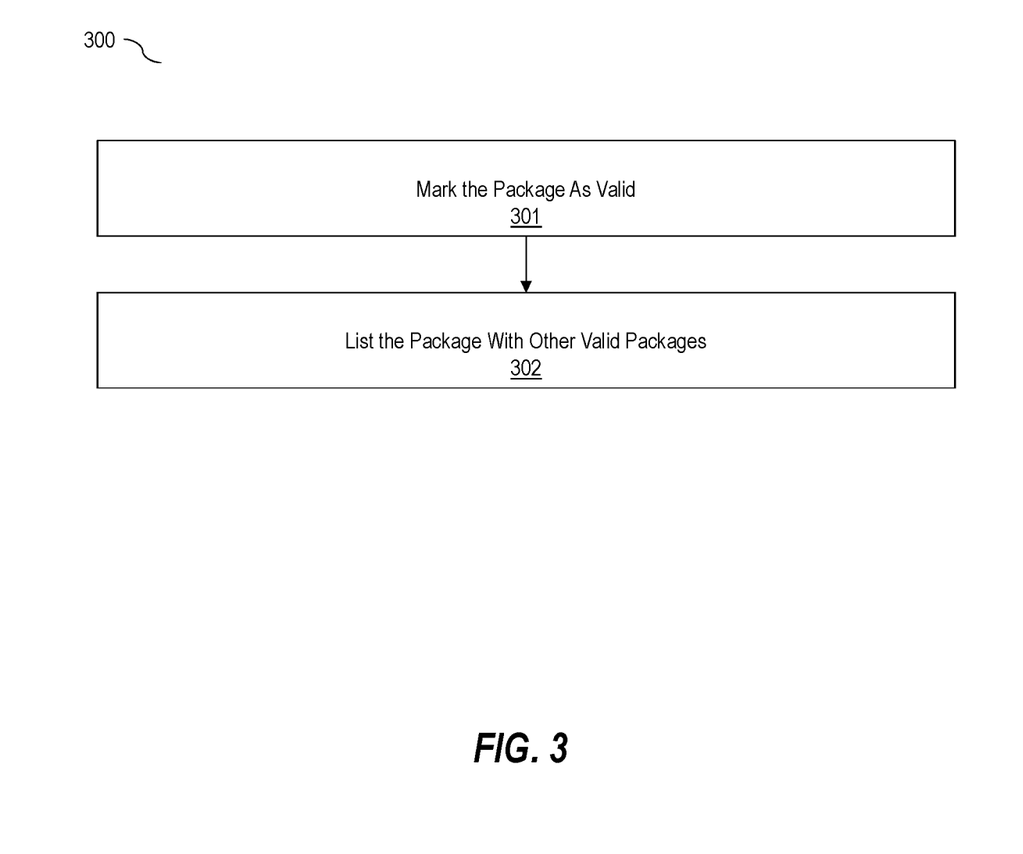
FIG. 3 illustrates a flowchart of a method for validating a package.

FIG. 3 illustrates a flowchart of a method 300 which may be used to validate a package as having functionality that is fully described by the source code. The method 300 of FIG. 3 may be performed to mark the original open source software package, in which case the method 300 would be performed after act 204 in FIG. 2. Alternatively, the method 300 of FIG. 3 may be performed to mark the rebuilt open source software package as valid, which would be performed after act 205 of FIG. 2.

The method 300 for validating the open source software package includes marking the open source software package as valid (act 301). This marking may include an indicator or stamp which illustrates the validation of the open source software package, or an indicator within the package demonstrating the validity of the open source software package. Following the marking, the open source software package may be added to a list of validated open source packages (act 302). Thus, over time, the developer and/or the organization that is collecting authoring software, may build a library of validated open source packages that are deemed safe, or which have a particular level of assessed risk.

Returning to FIG. 2, once the open source software packaged has been deemed likely safe because no additional functionality was detected, the open source software package awaits selection by a developer. A developer may or may not choose to use a safe open source software package in a codebase. Similarly, a rebuilt package may or may not be selected by a developer to be used in a codebase. Nevertheless, the safe open source software package is available for selection. Thus, following acts 204 or 206, the open source software package or the rebuilt package may be selected by a developer to be used in a codebase (act 207).

Finally, the method 200 includes incorporating the open source software package into a codebase (act 208). This incorporation includes using either the original open source software package or the rebuilt package. Thus, at this point, the code from the open source software package has been successfully and safely used within the codebase of the developer.

Figure 4:
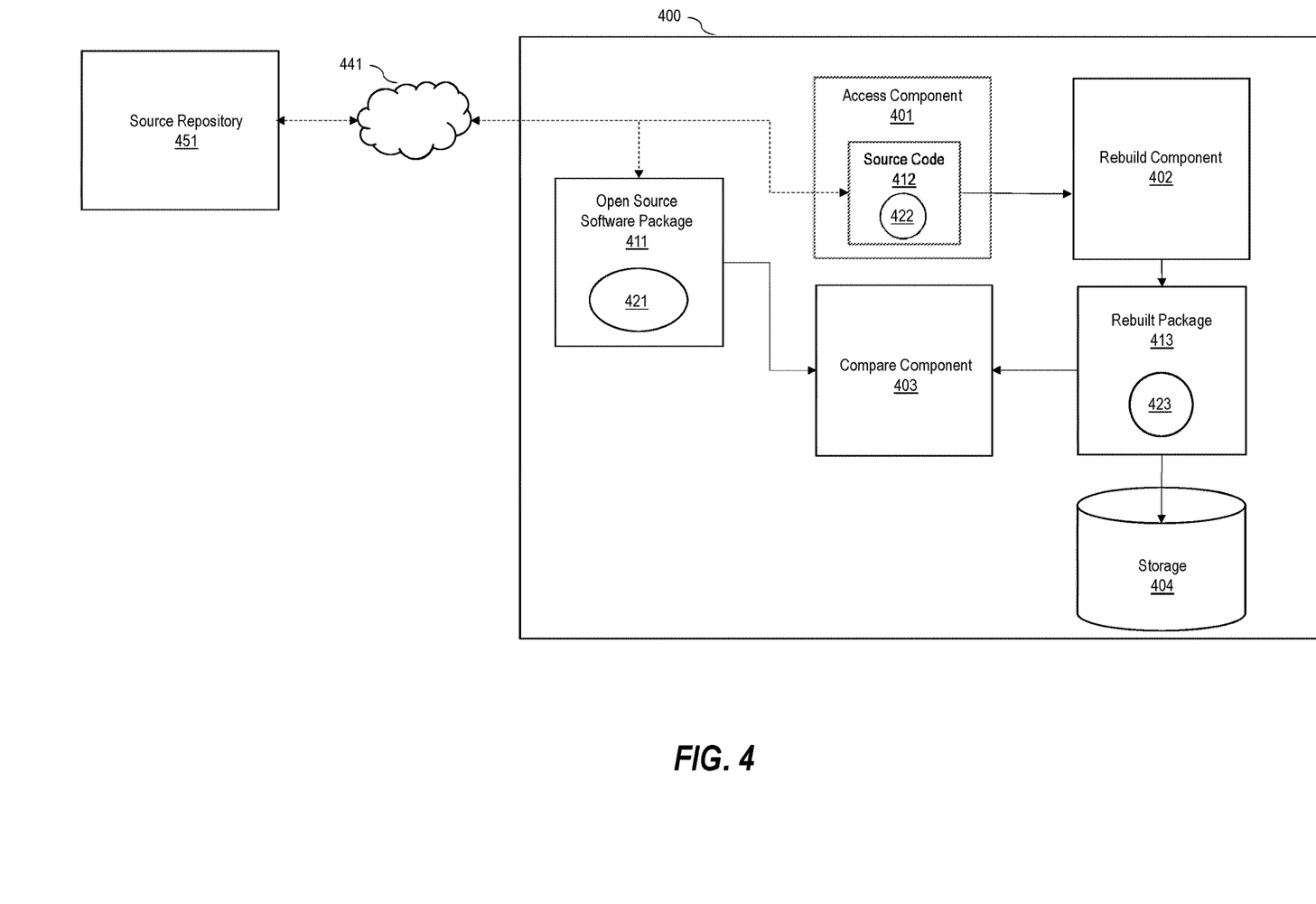
FIG. 4 illustrates an example build environment for detecting whether an open source software package has additional functionality.

FIG. 4 illustrates an environment 400 in which the method of FIG. 2 may occur. An access component 401 first accesses the source code 412. The access component 401 is an example of a component that performs the accessing described in act 201 of FIG. 2. If the environment 400 is implemented within a computing system, such as the computing system 700 described below with respect to FIG. 7, the access component 401 is structured as described below for the executable component 706.

The source code 412 is an example of the source code 101 depicted in FIG. 1. In order to access the source code 412, the access component identifies the source code 412. In some embodiments, the source code 412 is provided in the open source software package 411 and the access component 401 identifies and receives the source code 412 from the open source software package 411. Alternatively, or in addition, the open source software package 411 provides information representing the location where the source code 412 exists on a source repository 451. From this, the access component 401 identifies the location of the source code 412 on a source repository 451, and then addresses and receives the source code 412 over a network connection 441.

In one embodiment, the access component 401 identifies the location of the source code 412 from debugging information within a compiled executable in the open source software package 411. The debugging information could include symbols which map every line of code to a source repository 404 where the original source code 412 is stored. The access component will use the location obtained from the debugging information to identify the source code 412 on the source repository 451 and then address and receive the source code 412 over the network connection 441.

In some instances, the source code 412 is not in the open source software package 411, nor does the open source software package provide a location for the source code 412. In these instances, the provenance information of the open source software package 411 is established in order to identify the location of the original source code 412. Provenance information may include the version of the source code used to build the open source software package, the location of the source code, and/or the publisher who generated the open source software package. A developer or a package manager may provide provenance information for some open source software packages. However, that provenance information may be incomplete. For example, a package manager may provide publisher information and a source repository location but omit the version of source code used to generate the open source software package.

Establishing provenance is also advantageous because it gives the developer access to the original licenses for the source code. In some instances, there may be inconsistencies between the license file of the source code and the license file of the open source software package. Provenance gives a developer the ability to review the original licenses in order to identify the license terms of the open source software package and enables improved compliance with the license terms. Finally, establishing provenance is advantageous because it allows a developer to discover a publisher and/or verify the credibility of that publisher.

Provenance may be established in order to identify the source code and the publisher of an open source software package. In one embodiment, the access component 401 is structured to establish provenance to thereby identify and access the source code 412 with a predetermined process (described below) to identify the correct source repository 451 where the source code 412 is located. The predetermined process includes one or more acts that the access component 401 uses to search for a source repository 451 where the source code 412 is located. These acts will now be described. Though the acts themselves will be described below in a particular order within this document, no particular order is required when executing these acts within the predetermined process. Furthermore, the predetermined process may include any combination of the described acts. If the access component 401 finds the source code 412 before the predetermined process is complete, the access component 401 ends the predetermined process now that goal is accomplished.

As part of the predetermined process to find the source code associated with a particular open source software package 411, the access component 401 may search one or more package managers for a source repository that has a same or similar name to that of the particular open source software package 411. Once a source repository 451 is found, the access code can address and receive the source code 412 over a network connection. In some instances, after source repository is found 451, the access component 401 will identify the specific version of source code 412 used to originally build the open source software package 411. Identifying the specific version of source code 412 will be described in more detail below.

Also as part of the predetermined process, the access component 401 may search online forums for one or more discussions of an open source software package 411 with a same or similar name as the particular open source software package 411. If the access component 401 successfully identifies relevant forum discussions, the access component 401 may search the relevant discussions for provenance information of the open source software package 411. Using the identified provenance information, the access component 401 will address the source repository and receive the source code over a network connection.

Also as part of the predetermined process, the access component 401 may also be configured to identify a specific version of the source code used to build the open source software package 411. Source repositories with version control management may store multiple versions of source code used to build multiple versions of an open source software package. Each version of source code is saved as a commit within the source repository. The access component 401 may be configured to identify the specific commit used to build the open source software package. The access component 401 may identify the specific commit by matching a version number of the open source software package to a tagged release within the source repository. The access component 401 may also parse the release notes within a source repository for indications that a particular release is related to the open source software package 411.

Also as part of the predetermined process, the access component 401 may also identify the specific commit by performing a functional matching of source code 412 to the open source software package 411. First, the access component 401 will identify a range of commits likely to contain the specific commit. For example, the access component 401 may identify a range of commits which are time stamped near the publishing date of the open source software package 411. After identifying a range of commits, the access component 401 will rebuild the open source software package from each of the versions of source code corresponding to the range of commits resulting in multiple rebuilt packages. The environment 400 will then functionally match each of the rebuilt packages to the original open source software package 411 and the rebuilt package 413, and find the rebuilt open source software package that most closely matches the open source software package 411. Then, the source code commit used to build the most closely matching rebuilt package is found to be the source code.

In some instances, the rebuilt package 413 must be a bit-for-bit match to successfully confirm the provenance of the original open source software package 411. In this bit-for-bit case, this process simultaneously confirms that the open source software package 411 does not have any additional functionality.

If a source repository 451 or a specific commit for an open source software package 411 cannot be found, an attestation is made that the provenance of the open source software package 411 cannot be established and that additional functionality cannot be detected. Thus, the attestation is an indicator that the open source software package 411 is a high risk if incorporated into a codebase.

After the access component 401 has identified and/or accessed the source code 412, the source code is passed to a rebuild component 402. The rebuild component 402 is an example of a component that performs the rebuilding described in act 202 of FIG. 2. If the environment 400 is implemented within the computing system 700 described below with respect to FIG. 7, the rebuild component 402 is structured as described below for the executable component 706.

The rebuild component 402 may include a hardened build environment which does not allow external code to interact with the rebuilding. This is advantageous because it ensures that no additional functionality can be introduced during the rebuild of the open source software package 411. Additionally, the build environment itself may utilize the embodiments of the present application prior to each build to verify that the build environment and/or tools used by the build component 402 are safe to use because they have no additional functionality. Thus, the tools used to rebuild can also be generated from open source software packages, and thus those packages also may be rebuilt to verify no additional functionality has been added.

This is advantageous because it prevents compromised build environments or tools from introducing additional functionality into the rebuilt package 413 during the rebuild process. In some embodiments, the build component 402 will discard the build environment after the rebuild of the open source software package 411 for added security. In that case, any potentially compromised build environment is eliminated after every build.

In one embodiment, the build component 402 may be configured to rewrite the source code as interpretable code. This configuration is helpful to rebuild open source software packages which contain interpretable source code or the like. In some instances, the build component will conduct a naïve rebuild of the open source software package. To rebuild the open source software package 411, the build component 402 will access a directory of the open source software package 411 to identify runtime parameters used to originally build the open source software package 411 from the source code 412. For example, the runtime parameters may include runtimes, versions, and dependencies needed for building the code.

The build component 402 will create a new build environment with the identified parameters. In some embodiments, the new build environment is a hardened build environment, a private build environment, or both such that the build environment is inaccessible to external entities. For example, the new build environment will not be accessible through the internet or by other developers. Therefore, compromise of the new build environment is unlikely.

The build component 402 will copy the source code 412 to the new build environment. In some instances, the build component will utilize a hash to maintain and verify accurate copying of the copied source code. Finally, the build component 402 will execute the rebuild using the new build environment. In some instances, the rebuild will be conducted within a branch of the new build environment to preserve the purity of the source code 412.

In one embodiment, the rebuild component 402 may be configured to compile the source code to generate machine code. This configuration is helpful to rebuild an open source software package 411 that contains assembled code, machine code, an executable, a DLL, bytecode, or the like. In order to rebuild packages that require compilation or assembly, binaries in the open source software package should be deterministic. One of ordinary skill in the art will appreciate that deterministic binaries include reproducible bits because the original build of the binary avoided any non-deterministic decision making. Essentially, the original build avoided any processes which were not reproducible, such as using unrepeatable random number generators, time stamp information, and compilers with non-deterministic internal algorithms. Therefore, the rebuild component 402 must first determine that the open source software package 411 is deterministic.

Figure 5:
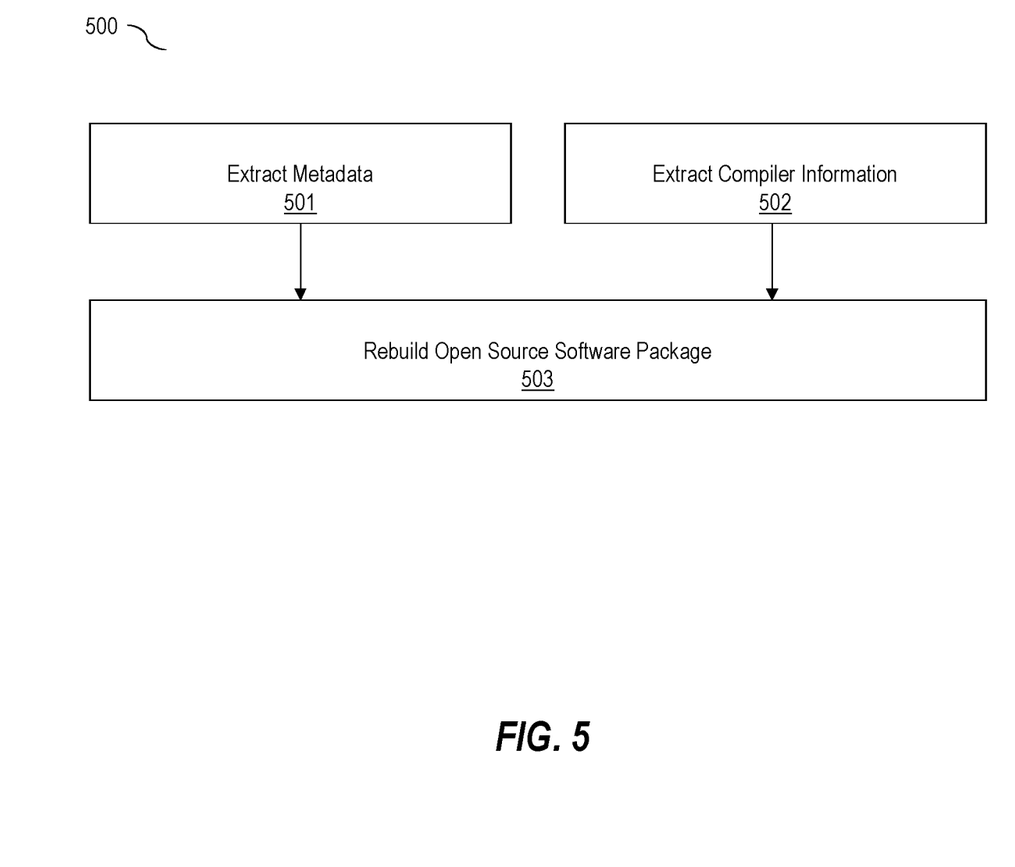
FIG. 5 illustrates a flowchart of a method of rebuilding an open source software package that includes a compiled artifact.

After the rebuild component 402 has determined that the open source software package is deterministic, the rebuild component 402 may utilize the method illustrated in FIG. 5 to rebuild the open source software package 411 and generate a rebuilt package 413. The method will now be described with respect to FIG. 5. First, the rebuild component 402 will extract embedded metadata from the open source software package (act 501). The embedded meta data includes the version of compiler used to build the open source software package, the versions of any tools used to build the open source software package, string definitions, language translations, and similar resources. The embedded metadata may be copied to a local directory for use during the rebuild.

The rebuild component 402 will also extract compiler information from the open source software package (act 502). The compiler information includes the information needed to re-create the deterministic build of the original open source software package from the source code. For example, the compiler information may include compilation flags, environment information, optimizations passed into the open source software package, or similar information. The compiler information may be copied to a local directory for use during the rebuild.

Acts 501 and 502 may be performed in any particular order, or in parallel. Following acts 501 and 502, the rebuild component 402 will rebuild the open source software package 411 from the source code 412 (act 503). The rebuild component 402 then produces a rebuilt package 413. The rebuilt package 413 includes functionality 423 which is fully described by the source code 412. In the illustrated case, note that the functionality 422 of the rebuilt package 413 and the functionality 422 of the source code 412 are both represented with a circle representing a corresponding functionality. The functionality 423 of the rebuilt package 413 may or may not be the same as the functionality 421 of the open source software package 411. As illustrated in FIG. 4, the functionality 421 of the open source software package 411 is represented with an oval to indicate similar but potentially different functionality from the functionality 423 of the rebuilt package 413.

Returning to FIG. 4, the rebuilt package 413 and the open source software package 411 are passed to the compare component 403 which computes whether or not the open source software package 411 has additional functionality. The compare component 403 is an example of a component that performs the comparison described in decision block 203 of FIG. 2. If the environment 400 is implemented within the computing system 700 described below with respect to FIG. 7, the compare component 403 is structured as described below for the executable component 706.

In one embodiment, the compare component 403 performs a bit-for-bit comparison of the rebuilt package 413 and the open source software package 411. In another embodiment, the signing information is stripped from the open source software package 411 prior to the comparison because the signing information cannot be replicated by the rebuild component. Thus, for example, the compare component 403 will compare the rebuilt package 413 to an un-signed version of the open source software package 411.

Where the rebuilt package 413 and the open source software package 411 are a match, the compare component 403 will estimate that the open source software package 411 has the same functionality 421 as the functionality 423 of the rebuilt package 413. This is an example of the estimating described in act 204 of FIG. 2 following a "Yes" in the decision block 203. The compare component 403 validates the original open source software package as being entirely described by the source code used to build the package and that the open source software package contains no additional functionality. Thereby validating that the original open source software package is safe to use. This is an example of the method illustrated by FIG. 3. Similarly, because the open source software package and the rebuilt package are a match, the rebuilt package is also safe to use.

Alternatively, where the rebuilt package 413 and the open source software package 411 are not a match, the compare component 403 may attempt another form a functional matching described further below. The compare component may also estimate that the open source software package 411 has a different functionality 421 than the functionality 423 of the rebuilt package 413. The compare component 403 may provide an attestation that the open source software package 411 is not entirely described by the source code 412 used to build that package 411 and that the open source software package 411 may contain additional functionality. Thereby attesting that the original open source software package 411 is not safe to use. This is an example of the estimating described in act 205 of FIG. 2 following a "No" in the decision block 203.

In another embodiment, functional matching can be inferred from a comparison of the file structure of the rebuilt package 413 and the file structure of the open source software package 411. The compare component 403 may utilize the method illustrated in FIG. 6 to make an inference of functional matching. First, the compare component 403 will compare a file structure of the open source software package to a file structure of the rebuilt package (act 601). The file structure includes one or more of the names of files, the locations of files, the sizes of files within the package, and other similar structures. For example, the comparison may entail comparing the location of files in the open source software package 411 to the location of files in the rebuilt package 413. Similarly, the comparison may entail comparing the sizes of files in the open source software package 411 to the sizes of files in the rebuilt package 413.

Figure 6:
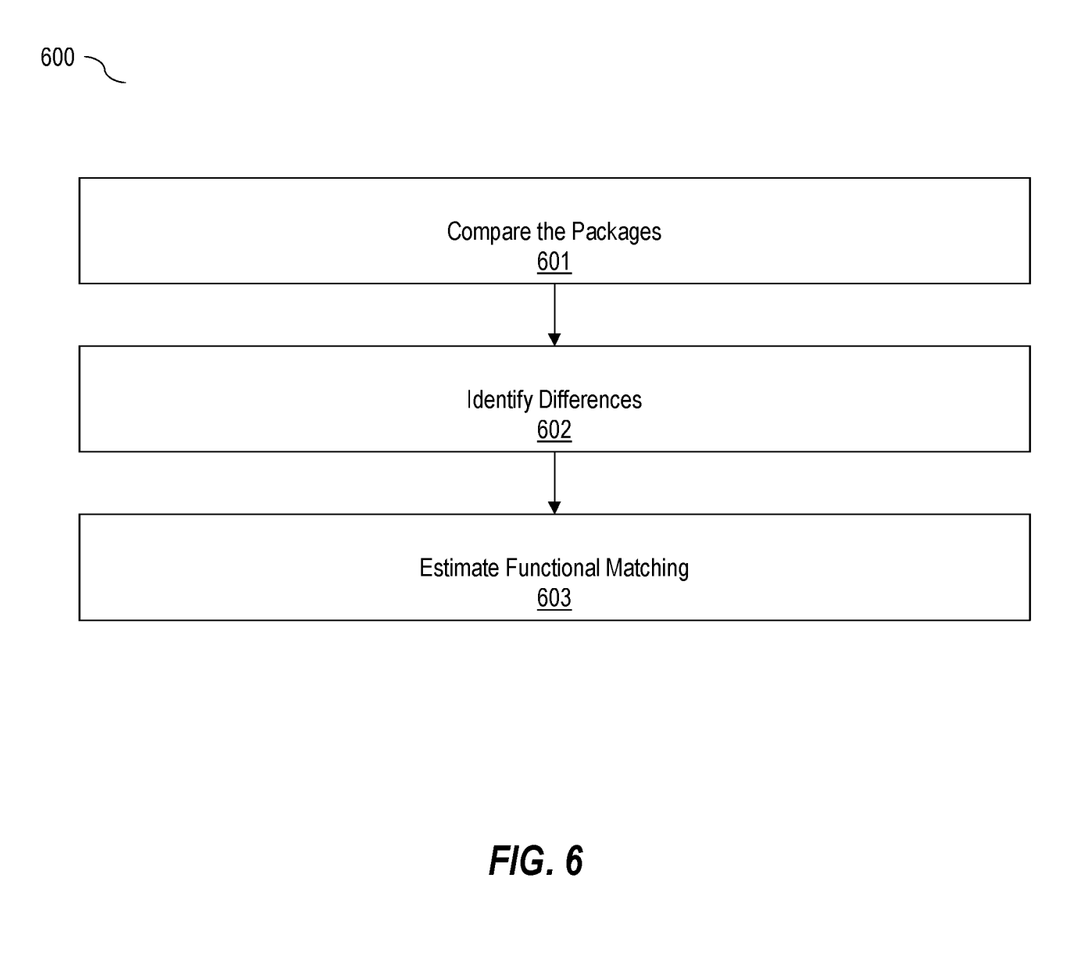
FIG. 6 illustrates a flowchart of a method for inferring functional matching of an open source software package and a rebuilt package.

The compare component 403 will use the comparison to identify whether the file structure of the open source package 411 and the file structure of the rebuilt package 413 are the same or whether the file structure of the open source package 411 and the file structure of the rebuilt package 413 has one or more differences (act 602). Finally, the compare component 403 will use the identified differences to estimate whether the rebuilt package 413 accomplishes the same function as the open source software package 411 or that the one or more differences are collectively consistent with the rebuilt package 413, and the open source software package 411 has different functionality (act 603). Some differences in file structure are not indicative of additional functionality in the open source software package 411. Therefore, the comparison component is configured to identify the differences in files structure and estimate which of the differences indicate different functionality between the rebuilt package 413 and the open source software package 411. Where there are such differences, it may estimate that the open source software package 411 has additional functionality.

Returning to FIG. 4, if the compare component 403 is configured to alert when additional functionality is detected in the open source software package 411. The alert is an example of the act 206 described in FIG. 2. The alert may include an audible or visual indicator displayed for a user on a user interface or output device that identifies an open source software package 411 as unsafe. The alert may also include an attestation on the open source software package 411 in the form of a stamp, flag, image, or other attestation. In another instance, the open source software package may be added to list of unsafe open source software packages. If the environment 400 is implemented within the computing system 700 described below with respect to FIG. 7, the alert may be performed by an input output mechanism 712.

Returning now to FIG. 4, following estimation of additional functionality, the original and/or rebuilt open source software packages await selection by a developer. A developer may or may not choose to use the original or rebuilt open source software packages in a code base. In some instance the original and rebuilt open source software package will await selection in storage 404.

If no additional functionality was detected in the open source software package 411, the open source software package 411 is safe to be used by a developer in a codebase. Alternatively, the developer may use the rebuilt package 413 in a codebase. For example, where the open source software package 411 had additional functionality and was estimated to be unsafe, the rebuilt package 413 can be incorporated into a codebase. Furthermore, even where no additional functionality was detected in the open source software package 411, a developer may choose to use the rebuilt package 413. For example, where functional matching was inferred, the rebuilt package 413 may be safer to use because it was generated in a hardened build environment. In other words, because the build environment of the rebuilt package 413 was known and uncompromised, a developer may choose to use a rebuilt package 413 for added security.

The rebuilt package 413 may be stored in storage 404 for future validation of the open source software package. In some instances, additional functionality may be introduced to an open source software package 411 or a rebuilt package 413 after the detection has already occurred and validation has been asserted. Thus, a copy of the rebuilt package 413 is retained to re-detect and re-validate the open source software package 411 or rebuilt package 413 when necessary. Functional matching and detection of additional functionality may be performed at any time during the use of an open source software package 411. For example, the detection of additional functionality may be performed before the open source software package is incorporated in a code base, before shipment of a product to a client, or before execution at runtime. Further, the functional matching may include bit-for-bit matching or an inference of functional matching as described with reference to FIG. 4.

The embodiments described herein could be used in an enterprise development system to provide an assessment of risk for the use of open source software packages within products. Developers often create products with dozens or hundreds of software packages which may include one or more open source software packages. Further, some open source software packages have dependencies to additional open source software packages. These dependencies increase the risk of using open source software packages as the dependencies are additional avenues of malicious code into a product. In addition, tracking the use of open source software packages and their dependencies can be difficult because enterprise development often spans across multiple teams and vendors which increases the difficulty of managing open source software package inventory and risk assessment.

At least one embodiment is used to simplify risk assessment and potentially manage risk of using open source software packages in development. This is done by tracking every build that occurs within an enterprise, mapping the dependencies of each open source software package used in that build, assigning the risk for each open source software package and its dependencies, providing an overall assessment of the risk for the product, and finally, reducing the risk by managing those risks.

One embodiment seeks to simplify a risk assessment open source software package inventory by including the risk assessment in the product build. For example, the risk assessment could be conducted as a new step during compilation. Once a product is ready for build, a risk assessment will be performed as follows. First, it will be determined which packages used in the product are unlikely to include harmful or malicious code and these packages will be excluded from the analysis (e.g., internal packages).

The remaining packages (e.g. the open source software packages) are identified and the dependencies of each open source software package are found. Dependencies can be identified by extracting dependency information. For example, some open source software packages declare dependencies to other packages in the package themselves and some open source software packages declare a dependency in a binary within the package. Dependencies include other open source software packages.

The risk is assessed for each open source software package and its dependencies. The risk is evaluated using one or more of the following factors. An open source software package with an unknown or untrusted author is an increased risk. An open source software package from a potentially unsafe source repository is an increased risk. For example, potentially unsafe source repository may include a source repository with one or few contributors or where code checks are infrequently performed. An open source software package which does not have source code available is an increased risk. An open source software package which is not rebuildable is an increased risk. Open source software packages which have been validated using the embodiments described herein with reference to FIGS. 3 and 4 are a reduced risk. Rebuilt packages which have been built from an open source software package using the embodiments described herein are a reduced risk.

After the risk of each open source software package, and overall risk assessment is made. The overall risk assessment is based on the risk assessment of each individual open source software package in addition to other factors. For example, the overall assessment may also factor an increased risk of using more open source software package or using open source software packages with more dependencies.

Following a risk assessment, an attempt is made to reduce the risk by detecting additional functionality in risky open source software packages using the embodiments described herein and validating the package as safe or attesting that the package is unsafe. By validating risky open source software packages as safe, the overall risk associated with the final product is reduced. In addition, the discovery of unsafe packages gives the developers the opportunity to potentially manage the issue before a product is shipped. Furthermore, risky packages may be replaced with rebuilt packages that have been built in a hardened environment using the embodiments disclosed herein. By replacing risky open source software packages with safer alternatives, the overall risk associated with the final product is reduced.

Finally, because the principles described herein may be performed in the context of a computing system some introductory discussion of a computing system will be described with respect to FIG. 7.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
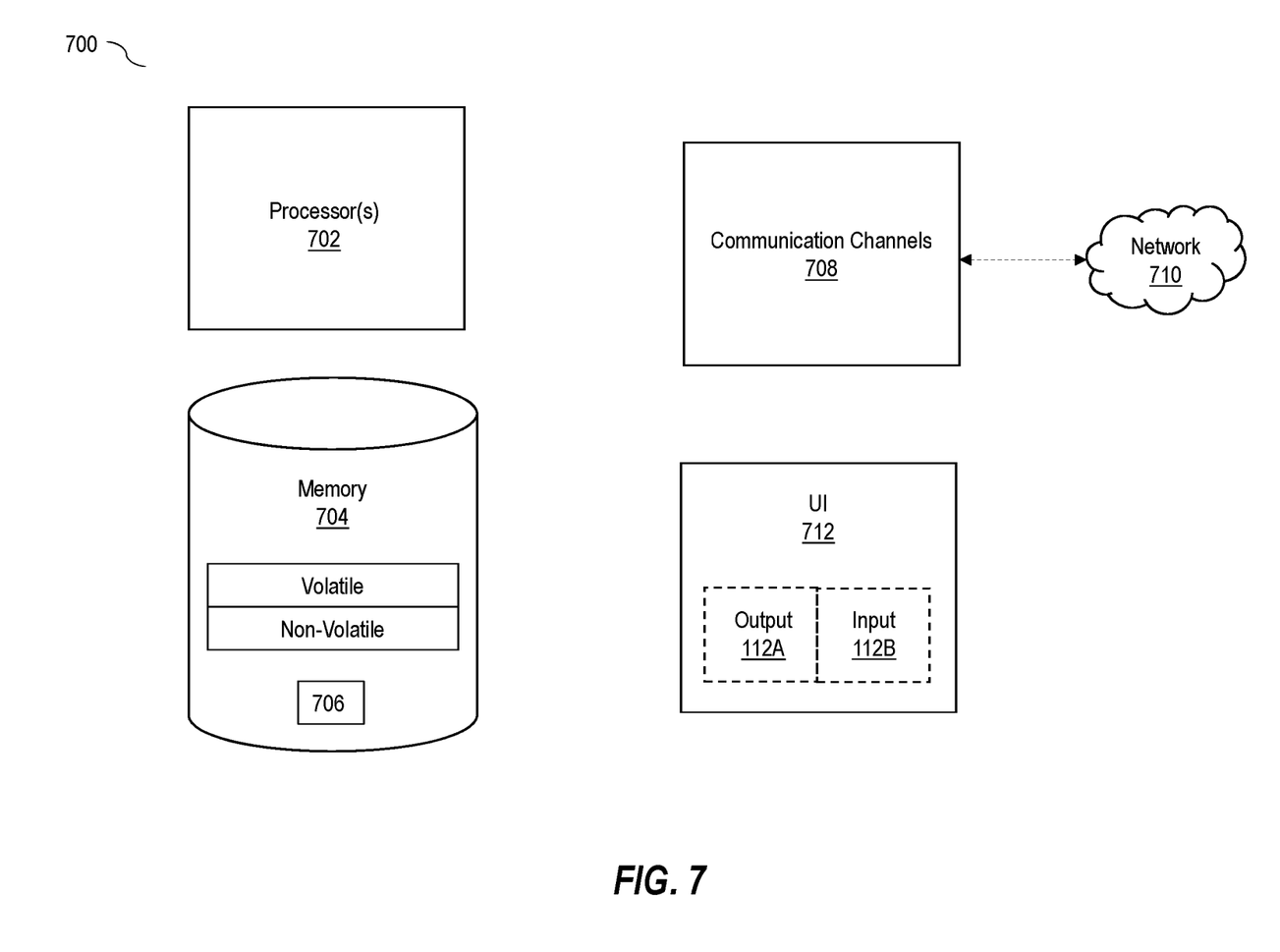
FIG. 7 illustrates an example computing system in which the principles described herein may be employed.

As illustrated in FIG. 7, in its most basic configuration, a computing system 700 typically includes at least one hardware processing unit 702 and memory 704. The processing unit 702 may include a general-purpose processor and may also include a field-programmable gate array (FPGA), an application-specific integrated circuit (ASIC), or any other specialized circuit. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 also has thereon multiple structures often referred to as an "executable component". For instance, memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms and so forth. Examples of input mechanisms 712B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NTC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The disclosed embodiments provide an avenue for developers to benefit from using open source software packages while also reducing the risk that is typically associated with open source software. One benefit of the disclosed embodiments is to detect additional functionality which is not described by the source code used to build the open source software package. Another benefit is to provide a developer with a safer rebuilt open source software package which can be used instead of a risky open source software package. The disclosed embodiments are also advantageous to reduce systematic risks of enterprise development that may rely on dozens or hundreds of open source software packages.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for detecting whether or not an open source software package has functionality which is not described by source code used to build the open source software package, the computing system comprising:
   one or more processors; and
   one or more computer-readable media having thereon computer-executable instructions that are structured such that, if executed by the one or more processors, the computing system is configured to:
   access the source code used to build the open source software package;
   rebuild the open source software package from the source code, the rebuild of the open source software package being configured to rewrite the source code as interpretable code, to access a directory of the open source software package to identify runtime parameters used to originally build the open source software package from the source code, create a new build environment with the identified parameters, and execute the rebuild using the new build environment;
   compute whether or not the rebuilt package accomplishes the same functions as the open source software package; and
   alert if the rebuilt package does not accomplish the same functions as the open source software package.

2. The computing system in accordance with claim 1, the computing system being further configured to identify the source code with a predetermined process that identifies a correct source repository where the source code is located.

3. The computing system in accordance with claim 1, the computing system is further configured to incorporate the rebuilt package into a codebase.

4. The computing system in accordance with claim 1, the computation of whether or not the rebuilt package accomplishes the same functions as the open source software package is further configured to:
   compare a file structure of the open source software package to a file structure of the rebuilt package;
   from the comparison, identify whether the file structure of the open source software package and the file structure of the rebuilt package are the same or whether the file structure of the open source software package and the file structure of the rebuilt package has one or more differences; and
   based on the identification, estimate whether the rebuilt package accomplishes the same function as the open source software package or that the one or more differences are collectively consistent with the rebuilt package and the open source software package having different functionality.

5. The computing system in accordance with claim 1, the rebuild of the open source software package from the source code is further configured to compile the source code to generate machine code.

6. The computing system in accordance with claim 5, the rebuild of the open source software package from the source code is further configured to:
   extract embedded metadata from the open source software package;
   extract compiler information from the open source software package; and
   rebuild the open source software package from the source code with the embedded metadata and compiler information.

7. A method for detecting whether or not an open source software package has functionality which is not described by source code used to build the open source software package, the method comprising:
   accessing the source code used to build the open source software package;
   rebuilding the open source software package from the source code, by at least rewriting the source code as interpretable code;
   computing whether or not the rebuilt package accomplishes the same functions as the open source software package;
   alerting if the rebuilt package does not accomplish the same functions as the open source software package;
   comparing a file structure of the open source software package to a file structure of the rebuilt package;
   from the comparison, identifying that the file structure of the open source software package and the file structure of the rebuilt package are the same; and
   based on the identification, estimating that the rebuilt package accomplishes the same function as the open source software package.

8. The method of claim 7, the method further comprising identifying the source code with a predetermined process that identifies a correct source repository where the source code is located.

9. The method of claim 7, the method further comprising incorporating the rebuilt package into a codebase.

10. The method of claim 7, the method further comprising validating and incorporating the open source software package into a codebase.

11. The method of claim 7, the rebuilding of the open source software package from the source code further comprising:
   accessing a directory of the open source software package to identify runtime parameters used to originally build the open source software package from the source code;
   creating a new build environment with the identified parameters; and
   executing the rebuild using the new build environment.

12. The method of claim 7, the computing of whether or not the rebuilt package accomplishes the same functions as the open source software package comprising:
   comparing a file structure of the open source software package to a file structure of the rebuilt package;
   from the comparison, identifying that the file structure of the open source software package and the file structure of the rebuilt package has one or more differences; and
   based on the identification, estimating that the one or more differences are collectively consistent with the rebuilt package and the open source software package having different functionality.

13. The method of claim 7, the rebuilding the open source software package from the source code comprises compiling the source code to generate machine code.

14. The method of claim 13, the rebuilding of the open source software package from the source code further comprising:
   extracting embedded metadata from the open source software package;
   extracting compiler information from the open source software package; and
   rebuilding the open source software package from the source code with the embedded metadata and compiler information.

15. A computing system for detecting whether or not an open source software package has functionality which is not described by source code used to build the open source software package, the computing system comprising:
   one or more processors; and
   one or more computer-readable media having thereon computer-executable instructions that are structured such that, if executed by the one or more processors, the computing system is configured to:
   access the source code used to build the open source software package;
   rebuild the open source software package from the source code, the rebuild of the open source software package being configured to compile the source code to generate machine code, extract embedded metadata from the open source software package, extract compiler information from the open source software package, and rebuild the open source software package from the source code with the embedded metadata and compiler information;
   compute whether or not the rebuilt package accomplishes the same functions as the open source software package; and
   alert if the rebuilt package does not accomplish the same functions as the open source software package.

* * * * *